(12) United States Patent
Yao et al.

(10) Patent No.: US 9,819,690 B2
(45) Date of Patent: Nov. 14, 2017

(54) MALICIOUS VIRTUAL MACHINE ALERT GENERATOR

(71) Applicant: EMPIRE TECHNOLOGY DEVELOPMENT LLC, Wilmington (DE)

(72) Inventors: Guang Yao, Haidian District (CN); Shijie Xu, Haidian District (CN); Qi Li, Haidian District (CN); Xuefeng Song, Shijiazhuang (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/768,960

(22) PCT Filed: Oct. 30, 2014

(86) PCT No.: PCT/CN2014/089859
§ 371 (c)(1),
(2) Date: Aug. 19, 2015

(87) PCT Pub. No.: WO2016/065565
PCT Pub. Date: May 6, 2016

(65) Prior Publication Data
US 2016/0255103 A1 Sep. 1, 2016

(51) Int. Cl.
*G06F 21/00* (2013.01)
*H04L 29/06* (2006.01)
(Continued)

(52) U.S. Cl.
CPC ...... *H04L 63/1416* (2013.01); *G06F 9/45558* (2013.01); *G06F 21/566* (2013.01);
(Continued)

(58) Field of Classification Search
CPC ............. H04L 63/1416; H04L 63/1425; G06F 9/45558; G06F 2009/45591; G06F 2009/45587
See application file for complete search history.

(56) References Cited

U.S. PATENT DOCUMENTS 8,363,656 B2 1/2013 Klink et al.
8,584,239 B2 11/2013 Aziz et al.
(Continued)

FOREIGN PATENT DOCUMENTS

| CN | 103109516 A | 5/2013 | |
|---|---|---|---|
| CN | 103703443 A | 4/2014 | |
| ES | WO 2013113532 A1 * | 8/2013 | ......... H04L 63/1416 |

OTHER PUBLICATIONS

N. Chandrakant, P. Deepa Shenoy, K. R. Venugopal, L. M. Patnaik; "Restricting the admission of selfish or malicious nodes into the network by using efficient security services in middleware for MANETs"; Feb. 2011; ICCCS '11: Proceedings of the 2011 International Conference on Communication, Computing & Security; Publisher: ACM; pp. 489-492.*

(Continued)

*Primary Examiner* — Shewaye Gelagay
*Assistant Examiner* — Courtney Fields
(74) *Attorney, Agent, or Firm* — Moritt Hock & Hamroff LLP; Steven S. Rubin, Esq.

(57) ABSTRACT

Technologies are generally described for methods and systems effective to generate an alert in a data center. In some examples, a device may detect an execution of a virtual machine in the data center. The device may also analyze traffic data at a port that may be in the data center. The traffic data may be associated with a communication from the virtual machine to a destination address through the port. The device may also compare the destination address with a (Continued)

data center address of the data center. The device may also generate the alert based on the comparison.

17 Claims, 5 Drawing Sheets

(51) Int. Cl.
  *G06F 21/56* (2013.01)
  *G06F 9/455* (2006.01)
  *G06F 17/30* (2006.01)
(52) U.S. Cl.
  CPC ...... *H04L 63/1425* (2013.01); *H04L 63/1441* (2013.01); *G06F 2009/45587* (2013.01); *G06F 2009/45591* (2013.01)

(56) References Cited

U.S. PATENT DOCUMENTS

| | | |
|---|---|---|
| 2011/0197189 A1 | 8/2011 | Wagner et al. |
| 2012/0210318 A1 | 8/2012 | Sanghvi et al. |
| 2012/0246740 A1 | 9/2012 | Brooker et al. |
| 2014/0137180 A1* | 5/2014 | Lukacs .................. G06F 21/53 726/1 |
| 2016/0036837 A1* | 2/2016 | Miao et al. ......... H04L 63/1458 726/23 |
| 2016/0036838 A1* | 2/2016 | Jain et al. ........... H04L 63/1416 726/23 |

OTHER PUBLICATIONS

Bellovin, S., "ICMP Traceback Messages," Accessed at https://web.archive.org/web/20130518033647/http://tools.ietf.org/html/draft-ietf-itrace-04, Dated Feb. 2003, pp. 18.

International Search Report and Written Opinion for International Patent Application No. PCT/CN2014/089859 dated Jul. 8, 2015, 8 pages.

Savage, S., et al., "Practical network support for IP traceback," Proceedings of the conference on Applications, Technologies, Architectures, and Protocols for Computer Communication, 2000, pp. 295-306.

Snoeren, A. C., "Hash-based IP traceback," Proceedings of the 2001 conference on Applications, technologies, architectures, and protocols for computer communications, Aug. 27-31, 2001, pp. 3-14.

* cited by examiner

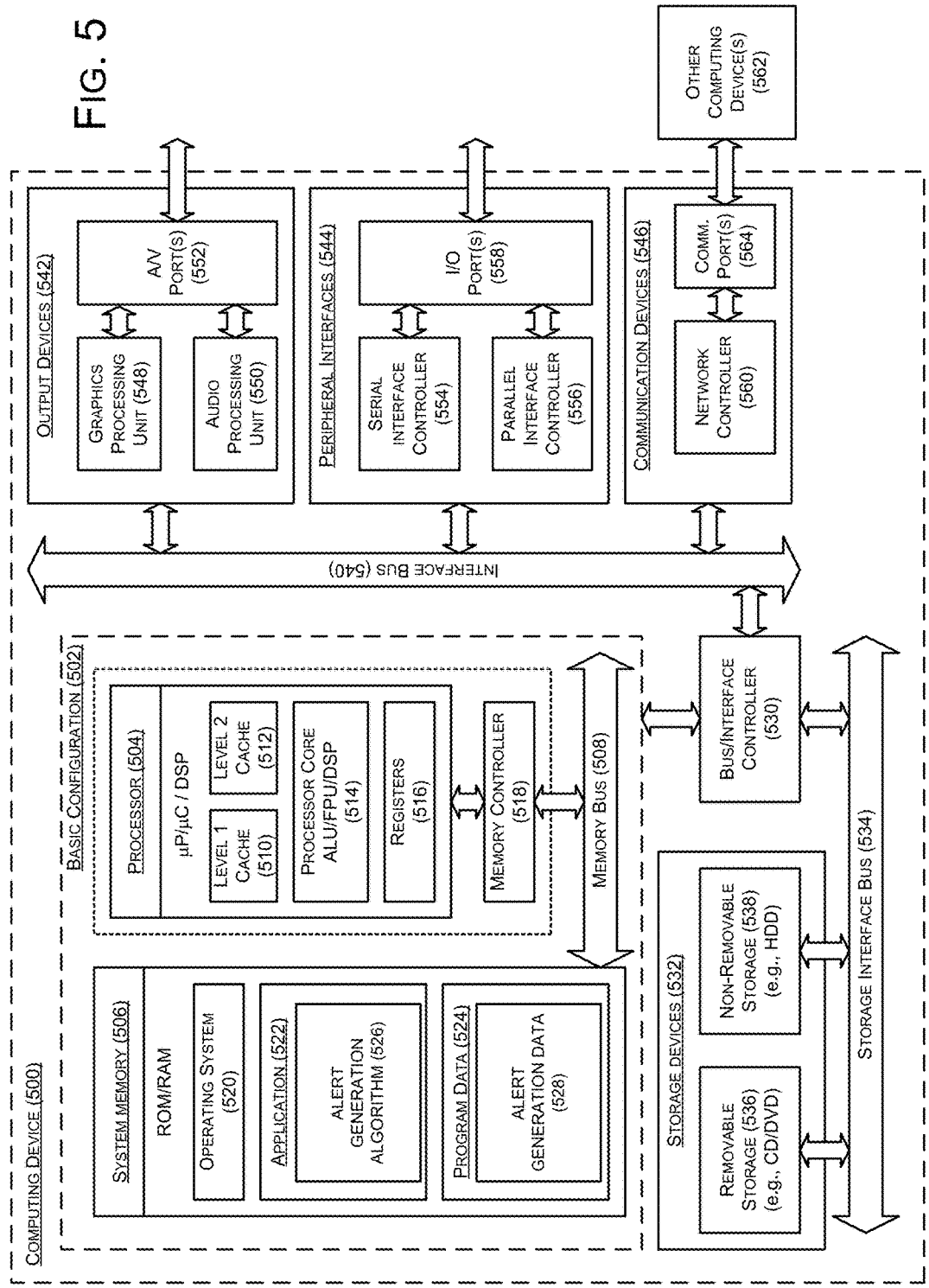

MALICIOUS VIRTUAL MACHINE ALERT GENERATOR

CROSS REFERENCE TO RELATED APPLICATION

This application is the U.S. National Stage filing under 35 U.S.C. §371 of International Application No. PCT/CN2014/089859 filed on Oct. 30, 2014. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

A data center may include a processor configured to execute one or more virtual machines. A virtual machine may be an instantiation of an operating environment, or may be an emulation of a computing system. The data center may be a provider of resources to perform computing services for users who purchased resources of the data center.

SUMMARY

In some examples, methods to generate an alert are generally described. The methods may include detecting, by a device, an execution of a virtual machine in a data center. The methods may also include analyzing, by a device, traffic data at a port in the data center. The traffic data may be associated with a communication from the virtual machine to a destination address through the port. The methods may also include comparing, by a device, the destination address with a data center address of the data center. The methods may also include generating, by a device, the alert based on the comparison.

In some examples, systems effective to generate an alert in a data center are generally described. The systems may include a memory, a port, a processor, and a device. The memory may be configured to store a data center address of the data center. The processor may be configured to be in communication with the memory and the port. The processor may be configured to execute a virtual machine in the data center. The device may be configured to be in communication with the memory, the port, and the processor. The device may also be configured to detect the execution of a virtual machine. The device may also be configured to analyze traffic data at the port. The traffic data may be associated with a communication from the virtual machine to a destination address through the port. The device may also be configured to compare the destination address with the data center address. The device may also be configured to generate the alert based on the comparison.

In some examples, devices effective to generate an alert in a data center are generally described. The devices may include a memory, a counter, and a processor. The memory may be configured to store a threshold. The counter may be configured to store a count. The processor may be configured to be in communication with the memory and the counter. The processor may be configured to receive a data center address of the data center. The processor may also be configured to detect an execution of a virtual machine in the data center. The processor may also be configured to analyze traffic data at a port of the data center. The traffic data may be associated with a communication from the virtual machine to a destination address through the port. The processor may also be configured to compare the destination address with the data center address. The processor may also be configured to control the counter to increment the count based on the comparison of the destination address with the data center address. The processor may also be configured to compare the count with the threshold. The processor may also be configured to generate the alert based on the comparison of the count with the threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is a block diagram illustrating an example computing device that is arranged to implement a malicious virtual machine alert generator, all arranged according to at least some embodiments described herein.

DETAILED DESCRIPTION

Figure 1:
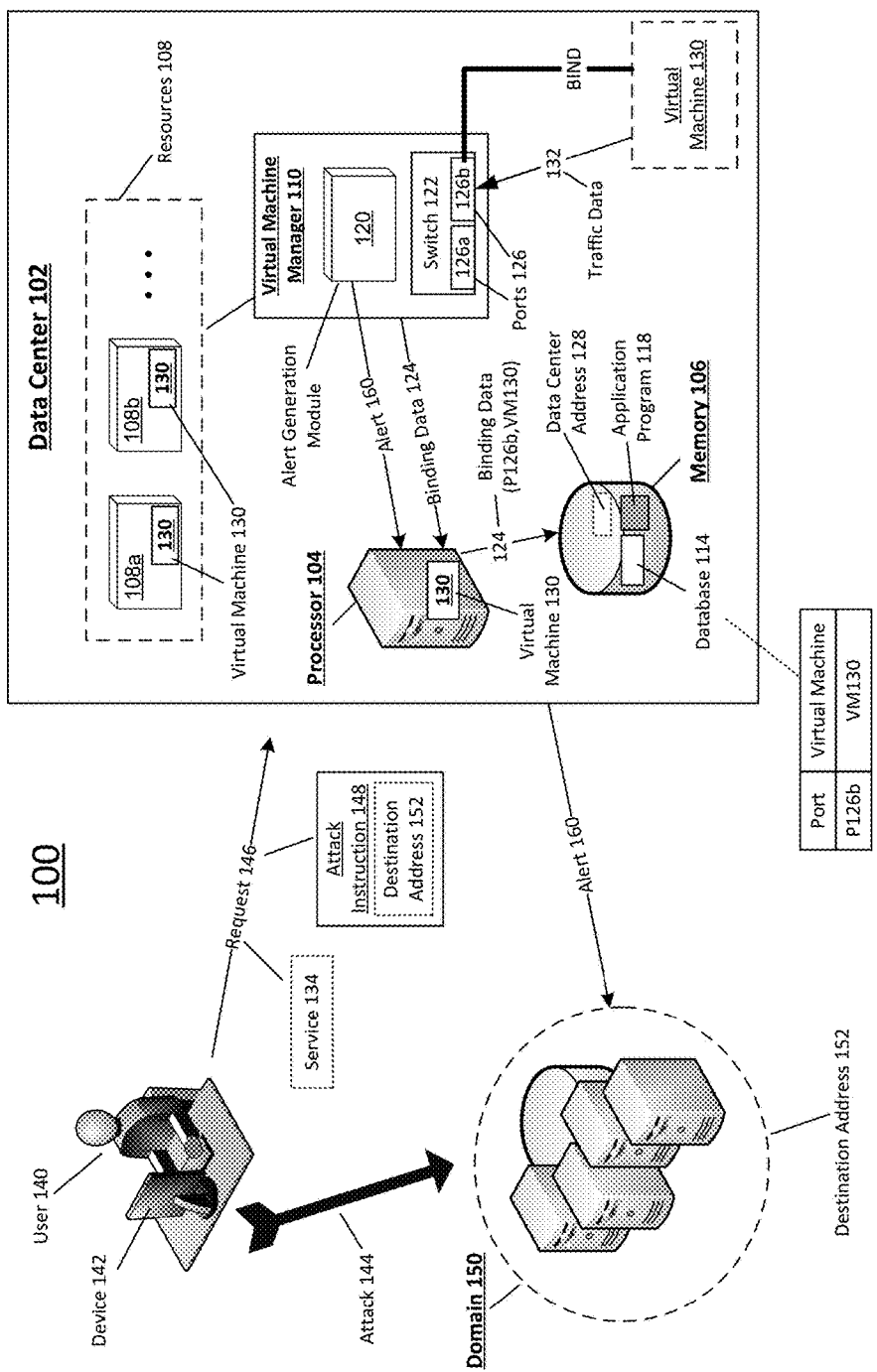
FIG. 1 illustrates an example system that can be utilized to implement a malicious virtual machine alert generator.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a malicious virtual machine alert generator.

Briefly stated, technologies are generally described for methods and systems effective to generate an alert of a malicious virtual machine in a data center. In some examples, a device may detect an execution of a virtual machine in a data center. The device may also analyze traffic data at a port that may be in the data center. For example, the device may analyze packets being transmitted through the port of the data center. The traffic data may be associated with a communication from the virtual machine to a destination address through the port. For example, the traffic data may be associated with a packet being transmitted by the virtual machine to the destination address such as in examples where the virtual machine is executing a malicious attack. The device may also compare the destination address with a data center address of the data center. This comparison may indicate whether the virtual machine is attempting to send a packet outside the data center. In response to a mismatch between the destination address and the data center address, the device may determine a count that may be associated with the mismatch. For example, the count may indicate how many times the virtual machine attempts to access a destination address that does not match the data center address. The device may also generate the alert based on the comparison.

FIG. 1 illustrates an example system 100 that can be utilized to implement a malicious virtual machine alert generator, arranged in accordance with at least some embodiments described herein. In an example and as depicted, system 100 may be implemented with a data center 102 configured to create and/or execute a virtual machine 130. As will be described in more detail below, system 100 may be implemented to detect an attack 144. As depicted, a user 140 may be attempting and/or conducting attack 144 on a domain 150 using a device 142 and/or a virtual machine 130. Domain 150 may be outside of data center 102, and may be associated with a website, a content provider, a data center, a network, etc. Attack 144 may include a DoS (Denial-of-Service) attack, a spoofing attack, a phishing attack, etc. A virtual machine manager 110 of data center 102 may monitor data transmission associated with data center 102, and based on the monitoring, may detect attack 144. An alert generation module 120 of virtual machine manager 110 may generate an alert 160 for domain 150 in response to detection of attack 144. Alert 160 may be a notification to warn domain 150 of a potential malicious data access attempt at domain 150 from virtual machine 130.

As depicted, data center 102 may be a provider of resources 108 (including resources 108a, 108b), such as processors, memory modules, graphics processors, etc., to perform computing services, such as, for example, a service 134. Service 134 may include data storage, data processing, execution of application programs, etc. Data center 102 may include a processor 104, a memory 106, resources 108, and/or a virtual machine manager 110. Processor 104, memory 106, resources 108, and/or virtual machine manager 110 may be configured to be in communication with each other. Processor 104 may be configured to execute one or more virtual machines, such as, for example, virtual machine 130, to perform service 134. Virtual machine 130 may be an instantiation of an operating environment, or may be an emulation of a computing system. In some examples, an image of virtual machine 130 may be stored in memory 106. Memory 106 may be further configured to store a set of data center addresses 128. Data center addresses 128 may include one or more addresses associated with components of data center 102, such as resources 108. Each address in data center addresses 128 may include a common address portion such as a prefix. For example, an address for resource 108a may be "1.23.45.61" and an address for resource 108b may be "1.23.56.49", where "1.23.0.0/16" may be a common address portion or prefix. In some examples, data center addresses 128 may be effective to indicate one or more common address portions of addresses of components of data center 102.

In some examples, virtual machine manager 110 may be a part of processor 104. In some examples, virtual machine manager 110 may be hardware or may be a combination of hardware and instructions executable on the hardware. Virtual machine manager 110 may be effective to control creation and/or operation of one or more virtual machines, such as, for example, virtual machine 130. In some examples, virtual machine manager 110 may create and/or control operation of virtual machine 130 through communication with processor 104. Virtual machine manager 110 may include an alert generation module 120 and a switch 122. In some examples, alert generation module 120 may be a device, and/or may be an integrated circuit such as, for example, microprocessor, SoC (System-on-a-Chip), ASIC (Application Specific Integrated Circuit), FPGA (Field-Programmable Gate Array), etc. Alert generation module 120 may be configured to generate alert 160 (further described below). Switch 122 may be a module of virtual machine manager 110 and may include one or more ports 126 (including ports 126a, 126b). Switch 122 may be configured to facilitate transmission of data among virtual machines being executed by data center 102, resources 108, and domains outside of data center 102, such as domain 150, through ports 126.

In an example, user 140 may perform attack 144 on domain 150 by requesting data center 102 to perform service 134. User 140 may use a device 142 to send a request 146 to data center 102. Request 146 may be a request to perform service 134, such as an execution of an application program 118, which may be stored memory 106 of data center 102. Request 146 may include an indication of service 134 and/or instructions to perform service 134. In the example, request 146 may further include attack instruction 148, where attack instruction 148 may include data and/or instructions associated with attack 144. Attack instruction 148 may further include an indication of a destination address 152, where destination address 152 may be an address of domain 150. Processor 104, or a receiver (such as a gateway) of data center 102, may receive request 146, and in response, may instruct virtual machine manager 110 to create or execute virtual machine 130.

Virtual machine manager 110 may create virtual machine 130 based on service 134. Virtual machine manager 110 may allocate one or more resources 108 in order to create or execute virtual machine 130. For example, execution of application program 118 may require a particular amount of memory and a particular amount processing speed. Virtual machine manager 110 may identify one or more resources 108 that may fulfill the requirements to execute application program 118. Virtual machine manager 110 may allocate the identified resources 108 in order to create virtual machine 130. In response to the creation of virtual machine 130, virtual machine manager 110 may bind virtual machine 130 to a port among ports 126. In the example, virtual machine manager 110 may bind virtual machine 130 to port 126b. Virtual machine manager 110 may generate binding data 124 that may effective to indicate the binding between port 126b and virtual machine 130. Binding data 124 may include an identification of virtual machine 130 (e.g., VM130 as depicted), and may include an identification of port 126b (e.g., P126b as depicted). Virtual machine manager 110 may send binding data 124 to processor 104. Processor 104 may update a database 114 based on binding data 124, where database 114 may be effective to store one or more pieces of binding data 124 in order to indicate bindings between ports 126 and virtual machines within data center 102.

As will be described in more detail below, processor 104 may execute virtual machine 130. Virtual machine manager 110 may detect execution of virtual machine 130 and in response, may analyze traffic data 132 at port 126b, which may be bound to virtual machine 130. Traffic data 132 may be data being transmitted from virtual machine 130 to one or more destination addresses, such as destination address 152, through port 126b. Virtual machine manager 110 may compare destination address 152 with data center address 128. Virtual machine manager 110 may determine whether destination address 152 matches with data center address 128. A match between destination address 152 and one of data center addresses 128 may indicate that virtual machine 130 is attempting to access a component within data center 102, where the component may be indicated by request 146 from device 142. A mismatch between destination address 152 and data center addresses 128 (no matches between destination address 152 and any of data center addresses 128) may indicate that virtual machine 130 is attempting to access an entity outside of data center 102. The mismatch may indicate that virtual machine 130 may be accessing an entity not requested in request 146, or may indicate that request 146 includes malicious instructions, such as attack instruction 148 that is associated with attack 144. In response to a mismatch between destination address 152 and data center addresses 128, virtual machine manager 110 may instruct alert generation module 120 to generate alert 160, and may send, or may instruct processor 104 to send, alert 160 to domain 150.

Figure 2:
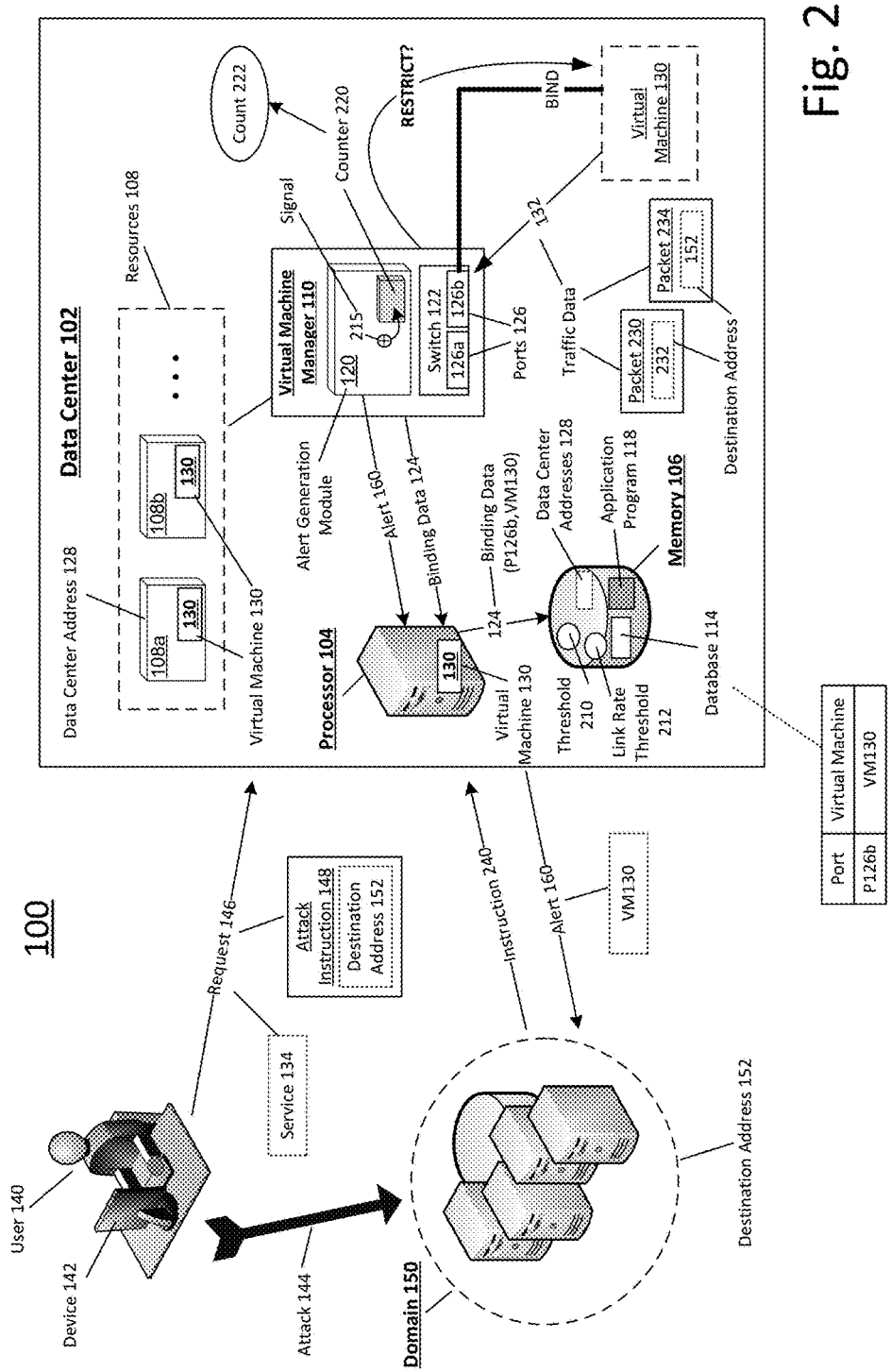
FIG. 2 illustrates the example system of FIG. 1 with additional detail relating to operations of a malicious virtual machine alert generator.

FIG. 2 illustrates system 100 of FIG. 1 with additional detail relating to a malicious virtual machine alert generator, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In an example and as depicted, alert generation module 120 may include a counter 220, where counter 220 may be configured to store a count 222. In some examples, count 222 may be effective to indicate a number of destination addresses that do not match any data center addresses 128. As will be discussed in more detail below, alert generation module 120 may be further configured to increment count 222 in response to a mismatch between destination address 152 and data center address 128. Alert generation module 120 may be further configured to compare count 222 with a threshold 210, which may be stored in memory 106. In some examples, threshold 210 may be a number effective to indicate a limit on a number of allowed mismatches between destination addresses and any of the data center addresses 128. In response to a determination that count 222 is greater than threshold 210, alert generation module 120 may generate alert 160.

In the example, processor 104 may execute virtual machine 130 to perform service 134, which may include execution of application program 118. Virtual machine 130 may communicate with components of data center 102, such as resources 108, through port 126b during execution of application program 118. Virtual machine manager 110 may detect execution of virtual machine 130 and in response, may monitor data being transmitted from virtual machine 130, such as by analyzing traffic data 132. In some examples, traffic data 132 may be generated by switch 122. Traffic data 132 may be effective to indicate destination addresses of packets being transmitted from virtual machine 130. In the example, during execution of application program 118, virtual machine 130 may transmit a packet 230 to a destination 232 and a packet 234 to destination address 152. Packet 234 may be associated with attack 144, and may be generated by virtual machine 130 based on attack instruction 148.

Data center address 128 may be an address associated with resources 108 or data center 102. For example, data center address 128 may be associated with resource 108a, which may be a memory module. In some examples, data center address 128 may be at least a part of an IP address prefix associated with data center 102. Virtual machine manager 110 may analyze destination addresses 232, 152 associated with packets 230, 234, respectively. Virtual machine manager 110 may compare destination addresses 232, 152 with data center address 128 that may be stored in memory 106. In an example, data center address 128 may include a prefix "1.23.0.0/16", destination address 232 may be "1.23.45.61" and destination address 152 may be "1.26.99.81". Virtual machine manager 110 may determine that destination address 232 may be same as data center address 128 or may include the prefix "1.23.0.0/16", and in response, may determine that destination address 232 matches with data center address 128. Similarly, virtual machine manager 110 may determine that destination address 152 may be different from data center address 128, or may not include the prefix "1.23.0.0/16", and in response, may determine that destination address 152 does not match with data center address 128. In response to the mismatch between destination address 152 and data center address 128, virtual machine manager 110 may command alert generation module 120 to generate alert 160.

In another example, data center address 128 may be "1.23.45.61", destination address 232 may be "1.23.46.73" and destination address 152 may be "1.26.99.81". Virtual machine manager 110 may determine that destination address 232 may be different from data center address 128, and may determine that destination address 232 includes a same prefix as data center address 128. Virtual machine manager 110 may determine that destination address 232 matches with data center address 128 based on the common prefix. Virtual machine manager 110 may determine that destination address 152 may be different from data center address 128, and that destination address 152 includes a prefix different from the prefix of data center address 128. Virtual machine manager 110 may determine a mismatch between destination address 152 and data center address 128 based on the difference and/or based on the different prefixes. In response to the mismatch between destination address 152 and data center address 128, virtual machine manager 110 may command alert generation module 120 to generate alert 160.

Alert generation module 120, in response to commands from virtual machine manager 110, may generate a signal 215 where signal 215 may be a pulse effective to activate counter 220. Alert generation module 120 may send signal 215 to counter 220 to activate counter 220 in order to increment count 222. Alert generation module 120, in response to an increment of count 222, may compare the incremented count 222 with threshold 210 that may be stored in memory 106. Alert generation module 120 may be further configured to reset counter 220, in order to reset count 222, based on operations of virtual machine manager 110. For example, virtual machine manager 110 may unbind virtual machine 130 from port 126b and bind virtual machine 130 to port 126a. Virtual machine manager 110 may notify alert generation module 120 of the change in binding of virtual machine 130, and alert generation module 120 may reset counter 220, which may reset count 222 to zero, in response to the notification.

In an example, threshold 210 may be a number such as an integer, or a decimal number, etc. For example, threshold 210 may be "100", which may indicate a limit of 100 allowed mismatches between destination addresses of packets requested, or transmitted, by virtual machine 130 and data center addresses 128. In the example, in response to a mismatch, alert generation module 120 may increment count 222 by one, such as from a count of "99" to a count of "100". A count of "100" may indicate that virtual machine 130 has attempted to communicate with one or more destination addresses that mismatches with data center address 128 for one hundred times. Alert generation module 120 may compare count 222 with threshold 210 and based on the comparison, may determine that count 222 has reached, or matches, threshold 210.

In some examples, memory 106 may further store a link rate threshold 212, where link rate threshold 212 may be a value effective to indicate a link rate limit in which virtual machine 130 may transmit packets. Count 222 may be effective to indicate a number of times virtual machine 130 attempts to transmit packets at a link rate that may be inconsistent, such as being greater than link rate threshold 212. For example, a link rate of port 126b may be configured to be "10 gigabytes", a link rate of resources 108 may be configured to be "1 gigabyte", and domain 150 may be associated with a link rate of "5 gigabytes". Threshold 210 may be "100", which may indicate a need to generate alert 160 when more than one hundred packet transmission attempts by virtual machine 130 includes a link rate greater than link rate threshold 212. Link rate threshold 212 may be "0.1", which may indicate a limit in which virtual machine 130 may transmit packets is 10 percent, or 0.1 of "10 gigabytes" (link rate of a port bound to virtual machine 130 e.g., port 126b), which is "1 gigabyte". In the example, traffic data 132 may indicate that packet 234 may be sent to destination address 152 at a link rate of "5 gigabytes", and packet 232 may be sent to destination address 232 at a link rate of "1 gigabyte". Alert generation module 120 may send signal 215 to counter 220 to increment count 222 in response to the link rate of packet 234 being greater than link rate threshold 212 of "1 gigabyte".

In another example, traffic data 132 may include first traffic data of port 126a and second traffic data of port 126b when virtual machine 130 is configured to perform communications through ports 126a, 126b. Counter 220 may include a first counter module assigned to port 126a and configured to store a first count, and may include a second counter module assigned to port 126b and configured to store a second count. Virtual machine manager 110 may monitor traffic data 132 through ports 126a, 126b and may be configured to command alert generation module 120 to activate first and second counter modules of counter 220. Alert generation module 120 may be configured to generate alert 160 based on a comparison of a sum of the first and second counts with threshold 210.

In response to count 222 reaching, or matching threshold 210, alert generation module 120 may analyze database 114, which may be stored in memory 106, in order to identify binding data 124. Alert generation module 120 may search for an indication, such as the identification "P126b", of port 126b in database 124. In response to finding the indication of port 126b, alert generation module 120 may identify binding data 124, which may include an indication, such as the identification "VM130", of virtual machine 130. Alert generation module 120 may generate alert 160 to include the identification "VM130" of virtual machine 130. Alert 160 may be, or may include, an ICMP (Internet Control Message Protocol) message, where a field of the ICMP message may include destination address 152, and a payload of the ICMP message may include the identification of virtual machine 130. Alert generation module 120 may be configured to digitally sign alert 160, such as by PKI (Public Key infrastructure) or RSA technology, and may send alert 160 to destination address 152. In some examples, alert generation module 120 may send alert 160 to an entity such as a cybersecurity service provider, or a security domain associated with data center 102. In some examples, domain 150 may respond to alert 160 by sending an instruction 240 to data center 102. Instruction 240 may be an instruction to request data center 102 to restrict execution of virtual machine 130, such as to stop the execution of virtual machine 130, or to prevent virtual machine 130 from communicating with domain 150. Processor 104 may receive instruction 240 and in response, may restrict execution of virtual machine 130 or may command virtual machine manager 110 to restrict execution of virtual machine 130.

Among other possible benefits, a system in accordance with the disclosure may benefit data centers and domain owners such as a website owner. Data centers may benefit from a system in accordance with the disclosure by offering additional security to protect users who requested services to be performed by the data centers. Data centers may market their services based on the additional security feature related to the system in accordance with the disclosure. Users who requested services to be performed by data centers may be protected by a system in accordance with the disclosure since the users may have an option to request the data center to restrict suspicious virtual machines. The users may also be provided with a security feature to trace an attack, such as by tracing back to a virtual machine that may not have a public IP address, instead of merely being able to trace back to a gateway of the data center during tracing of an attack. By tracking back to a virtual machine, the virtual machine which sent suspicious packets may be identified and the data center may restrict the identified virtual machine.

Figure 3:
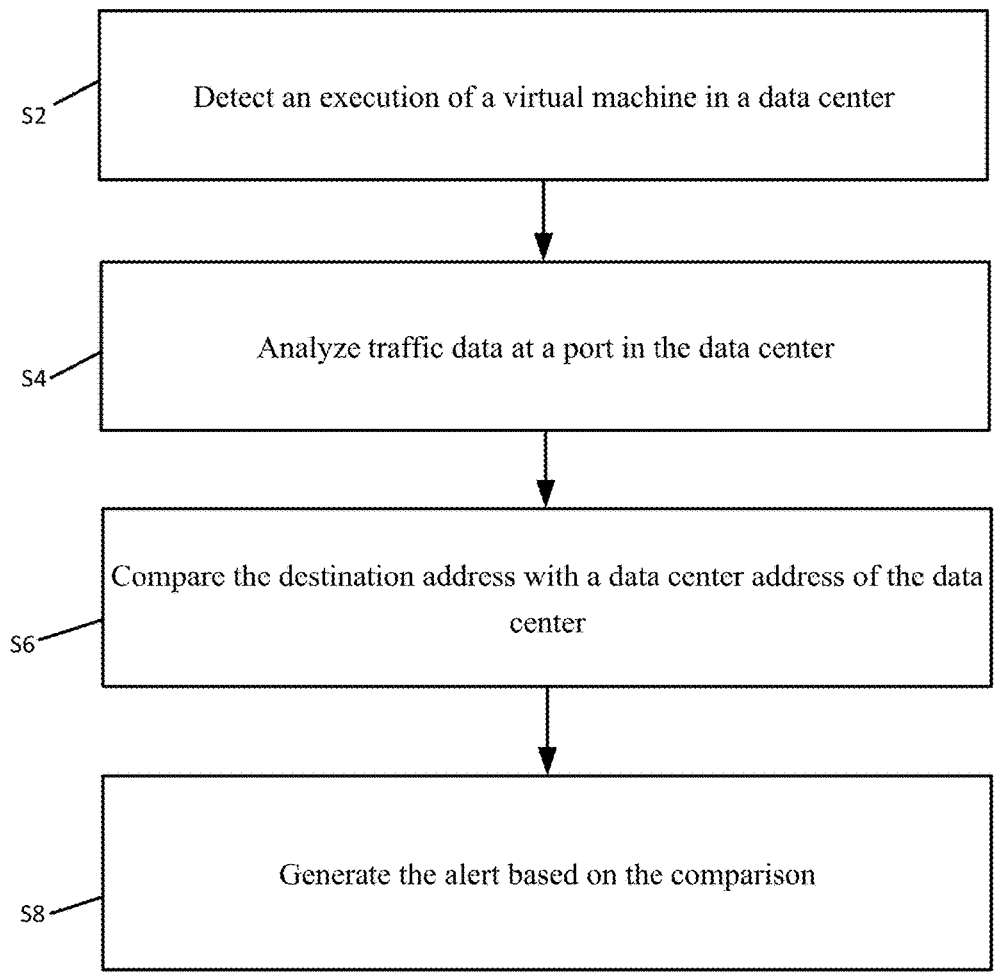
FIG. 3 illustrates a flow diagram for an example process to implement a malicious virtual machine alert generator.

FIG. 3 illustrates a flow diagram for an example process for implementing a malicious virtual machine alert generator, arranged in accordance with at least some embodiments presented herein. The process in FIG. 3 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Detect an execution of a virtual machine in a data center". At block S2, a device may detect an execution of a virtual machine in a data center.

Processing may continue from block S2 to block S4, "Analyze traffic data at a port in the data center". At block S4, the device may analyze traffic data at a port in the data center. The traffic data may be associated with a communication from the virtual machine to a destination address through the port.

Processing may continue from block S4 to block S6, "Compare the destination address with a data center address of the data center". At block S6, the device may compare the destination address with a data center address of the data center. In response to a mismatch between the destination address and the data center address, the device may determine a count associated with the mismatch. The device may further compare the count with a threshold.

Processing may continue from block S6 to block S8, "Generate the alert based on the comparison". At block S8, the device may generate the alert based on the comparison. In some examples, the device may generate the alert based on the comparison of the count with the threshold. Generation of the alert may include identifying binding data associated with the virtual machine. The binding data may be effective to indicate a binding between the virtual machine and the port. The binding data may include an identification of the virtual machine. The device may generate the alert to include the identification of the virtual machine. The device may further sign the alert and may send the alert to the destination address. The device may receive an instruction from the destination address, where the instruction may be an instruction to restrict the execution of the virtual machine. In some examples, the alert may be an ICMP (Internet Control Message Protocol) message.

Figure 4:
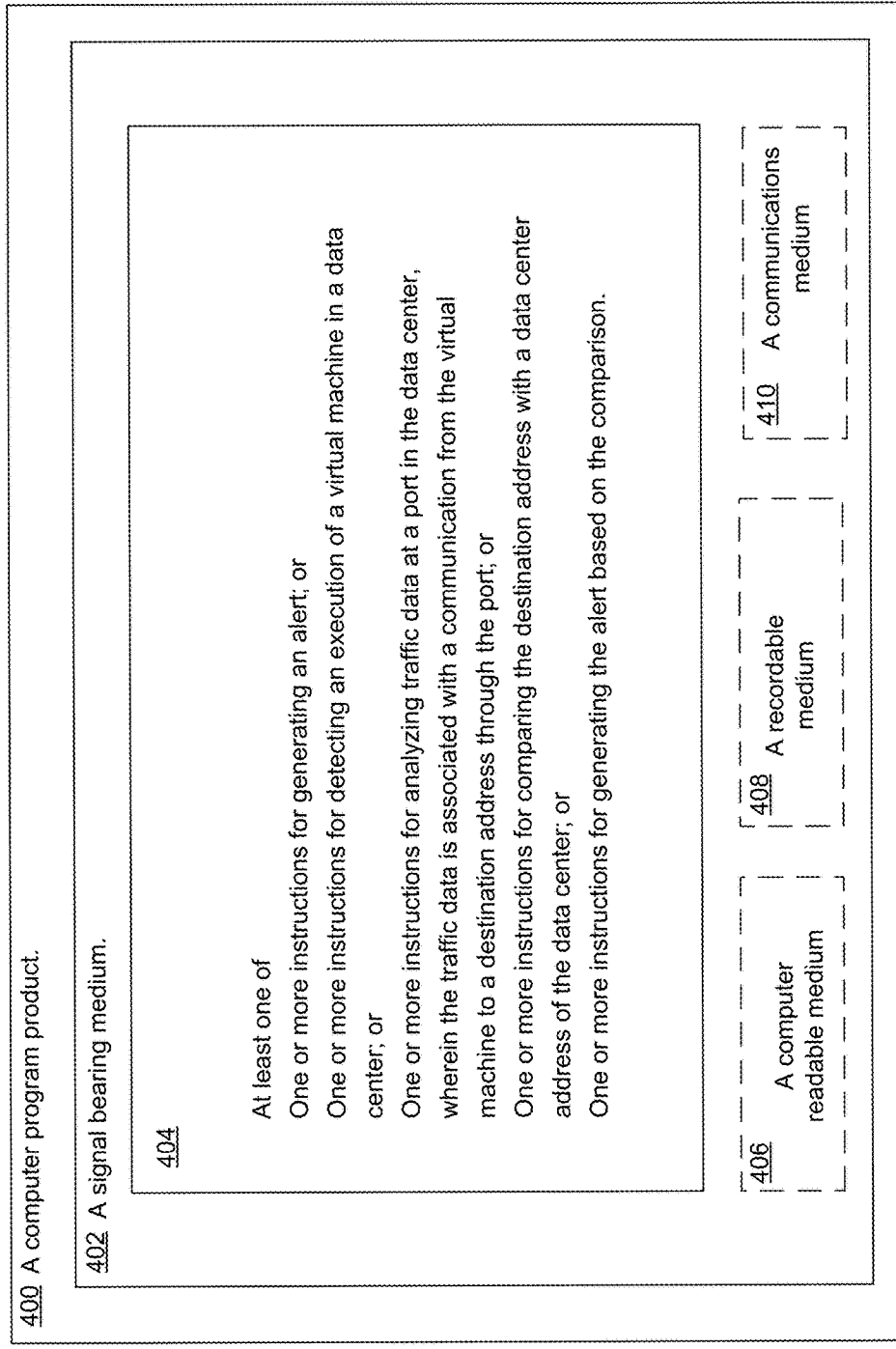
FIG. 4 illustrates an example computer program product that can be utilized to implement a malicious virtual machine alert generator.

FIG. 4 illustrates an example computer program product 400 that can be utilized to implement a malicious virtual machine alert generator, arranged in accordance with at least some embodiments described herein. Computer program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, processor 104 may undertake one or more of the blocks shown in FIG. 3 in response to instructions 404 conveyed to the system 100 by signal bearing medium 402.

In some implementations, signal bearing medium 402 may encompass a computer-readable medium 406, such as, but not limited to, a hard disk drive (HDD), a Compact Disc (CD), a Digital Video Disc (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). Thus, for example, program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

FIG. 5 is a block diagram illustrating an example computing device 500 that is arranged to implement a malicious virtual machine alert generator, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations, memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an alert generation algorithm 526 that is arranged to perform the functions as described herein including those described with respect to system 100 of FIGS. 1-3. Program data 524 may include alert generation data 528 that may be useful for implementation of a malicious virtual machine alert generator as is described herein. In some embodiments, application 522 may be arranged to operate with program data 524 on operating system 520 such that implementations of a malicious virtual machine alert generator may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disc (CD) drives or digital versatile disc (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile discs (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (FDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended in fall within the scope of the appended claims. The present disclosure is to be limited only by the terms of the appended claims, along with the frill scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate an alert, the method comprising, by a device:
receiving a request from a user to perform a service;
in response to the request received from the user, creating a virtual machine in a data center to perform the service;
analyzing traffic data at a port in the data center, wherein the traffic data is associated with a communication from the virtual machine to a destination address through the port, wherein the destination address is an address of a domain outside of the data center;
comparing the destination address with a data center address of the data center;
generating the alert based on the comparison, wherein generating the alert comprises:
identifying binding data associated with the virtual machine, wherein the binding data is effective to indicate a binding between the virtual machine and the port, and the binding data includes the identification of the virtual machine, wherein the alert includes the binding data that identifies the virtual machine that is executed at the data center;
sending the alert to the destination address; and
receiving an instruction from the destination address to restrict the execution of the virtual machine.

2. The method of claim 1, further comprising:
signing, by the device, the alert.

3. The method of claim 1, further comprising:
restricting the execution of the virtual machine.

4. The method of claim 1, wherein when the comparison indicates a mismatch between the destination address and the data center address, the method further comprises, prior to generating the alert:
determining a count associated with the mismatch; and
comparing the count with a threshold, wherein generation of the alert is further based on the comparison of the count with the threshold.

5. The method of claim 4, prior to determining the count, the method further comprising:
generating a signal in response to the mismatch; and
sending the signal to a counter to increment the count.

6. The method of claim 1, wherein generating the alert is performed in response to a mismatch between the destination address and the data center address.

7. The method of claim 1, wherein the alert is an ICMP (Internet Control Message Protocol) message.

8. The method of claim 1, wherein the port is a first port, the traffic data is first traffic data, the communication is a first communication, the destination address is a first destination address, the method further comprising:
prior to generating the alert, analyzing second traffic data at a second port in the data center, wherein the second traffic data is associated with a second communication from the virtual machine to a second destination address through the second port;
comparing the second destination address with the data center address of the data center; determining a first count associated with a first mismatch between the first destination address and the data center address;
determining a second count associated with a second mismatch between the second destination address and the data center address;
determining a total count based on a combination of the first count and the second count; comparing the total count with a threshold, wherein generation of the alert is further based on the comparison of the total count with the threshold.

9. A system effective to generate an alert in a data center, the system comprising:
a memory configured to store a data center address of the data center;
a port;
a processor configured to be in communication with the memory and the port, the processor being configured to execute a virtual machine in the data center;
a device configured to be in communication with the memory, the port, and the processor, the device being configured to:
receive a request from a user to perform a service;
create the virtual machine to perform the service;
identify the binding data;
analyze traffic data at the port, wherein the traffic data is associated with a communication from the virtual machine to a destination address through the port, wherein the destination address is an address of a domain outside of the data center;
compare the destination address with the data center address;
generate the alert based on the comparison, wherein the alert includes an identification of the virtual machine that is executed at the data center;
send the alert to the destination address; and
receive an instruction from the destination address to restrict the execution of the virtual machine,
wherein the memory is further configured to store binding data associated with the virtual machine, and wherein the binding data is effective to indicate a binding between the virtual machine and the port, and the binding data includes the identification of the virtual machine.

10. The system of claim 9, wherein the device is further configured to:
sign the alert.

11. The system of claim 9, wherein the device is further configured to:
restrict the execution of the virtual machine.

12. The system of claim 9, further comprising a counter configured to be in communication with the device, wherein the memory is further configured to store a threshold, and the device is further configured to:
generate a signal in response to a mismatch indicated by the comparison between the destination address and the data center address;
send the signal to the counter to increment a count associated with the mismatch; and
compare the count with the threshold, wherein generation of the alert is further based on the comparison of the count with the threshold.

13. The system of claim 9, wherein the alert is an ICMP (Internet Control Message Protocol) message.

14. A device effective to generate an alert in a data center, the device comprising:
a memory configured to store a threshold;
a counter configured to store a count;
a processor configured to be in communication with the memory and the counter, the processor being configured to:
receive a request from a user to perform a service;
receive a data center address of the data center;
create a virtual machine in the data center to perform the service;

receive binding data associated with the virtual machine, wherein the binding data is effective to indicate a binding between the virtual machine and the port, and wherein the binding data includes the identification of the virtual machine;

analyze traffic data at a port of the data center, wherein the traffic data is associated with a communication from the virtual machine to a destination address through the port, wherein the destination address is an address of a domain outside of the data center;

compare the destination address with the data center address;

control the counter to increment the count based on the comparison of the destination address with the data center address;

compare the count with the threshold;

generate the alert based on the comparison of the count with the threshold, wherein the alert includes an identification of the virtual machine that is executed at the data center;

send the alert to the destination address; and receive an instruction from the destination address to restrict the execution of the virtual machine.

15. The device of claim 14, wherein the processor is further configured to:

sign the alert.

16. The device of claim 14, wherein the processor is further configured to:

restrict the execution of the virtual machine.

17. The device of claim 14, wherein the alert is an ICMP (Internet Control Message Protocol) message.

* * * * *

UNITED STATES PATENT AND TRADEMARK OFFICE
CERTIFICATE OF CORRECTION

PATENT NO. : 9,819,690 B2  
APPLICATION NO. : 14/768960  
DATED : November 14, 2017  
INVENTOR(S) : Yao et al.

Page 1 of 1

It is certified that error appears in the above-identified patent and that said Letters Patent is hereby corrected as shown below:

On the Title Page

In Item (71), under "Applicant", in Column 1, Lines 1-3, delete "EMPIRE TECHNOLOGY DEVELOPMENT LLC, Wilmington (DE)" and insert -- EMPIRE TECHNOLOGY DEVELOPMENT LLC, Wilmington, DE (US) --, therefor.

In the Specification

In Column 1, Line 4, delete "CROSS REFERENCE" and insert -- CROSS-REFERENCE --, therefor.

In Column 4, Line 33, delete "stored memory" and insert -- stored in memory --, therefor.

In Column 7, Lines 36-37, delete "130 e.g.," and insert -- 130 – e.g., --, therefor.

In Column 8, Lines 8-9, delete "infrastructure)" and insert -- Infrastructure) --, therefor.

In Column 11, Line 22, delete "(FDA)," and insert -- (PDA), --, therefor.

In Column 11, Line 38, delete "intended in" and insert -- intended to --, therefor.

In Column 11, Line 40, delete "frill" and insert -- full --, therefor.

Signed and Sealed this  
Thirteenth Day of February, 2018

Andrei Iancu  
*Director of the United States Patent and Trademark Office*